United States Patent
Rapp et al.

(10) Patent No.: US 8,824,891 B2
(45) Date of Patent: Sep. 2, 2014

(54) METHOD AND APPARATUS FOR PREVENTING SIGNAL INTERFERENCE IN A PASSIVE OPTICAL NETWORK

(75) Inventors: Lutz Rapp, Deisenhofen (DE); Dario Setti, München (DE)

(73) Assignee: Xieon Networks S.a.r.l, Luxembourg (LU)

( * ) Notice: Subject to any disclaimer, the term of this patent is extended or adjusted under 35 U.S.C. 154(b) by 77 days.

(21) Appl. No.: 13/518,277

(22) PCT Filed: Dec. 17, 2010

(86) PCT No.: PCT/EP2010/070021
§ 371 (c)(1),
(2), (4) Date: Jul. 17, 2012

(87) PCT Pub. No.: WO2011/076671
PCT Pub. Date: Jun. 30, 2011

(65) Prior Publication Data
US 2012/0275782 A1 Nov. 1, 2012

(30) Foreign Application Priority Data
Dec. 21, 2009 (EP) .................................. 09180178

(51) Int. Cl.
| | |
|---|---|
| H04J 14/00 | (2006.01) |
| H04J 14/02 | (2006.01) |
| H04B 10/85 | (2013.01) |
| H04B 10/272 | (2013.01) |
| H04L 12/26 | (2006.01) |

(52) U.S. Cl.
CPC ......... *H04J 14/0282* (2013.01); *H04J 14/0276* (2013.01); *H04J 14/0275* (2013.01); *H04J 14/0258* (2013.01); *H04J 14/025* (2013.01); *H04B 10/85* (2013.01); *H04B 10/272* (2013.01); *H04L 12/26* (2013.01); *H04J 14/0269* (2013.01); *H04J 14/0287* (2013.01); *H04J 14/0247* (2013.01)

USPC ................... 398/72; 398/66; 398/67; 398/70; 398/71; 398/100; 398/33; 398/25; 398/45; 398/30; 370/352; 370/392; 370/389; 370/468

(58) Field of Classification Search
USPC ........... 398/66, 67, 68, 69, 70, 71, 72, 98, 99, 398/100, 33, 30, 31, 32, 38, 1, 2, 3, 4, 5, 45, 398/48, 10, 13, 17, 22, 23; 370/352, 389, 370/468, 392, 466, 351, 395.31
See application file for complete search history.

(56) References Cited

U.S. PATENT DOCUMENTS

| | | | |
|---|---|---|---|
| 7,577,362 B2 * | 8/2009 | Kasai et al. ..................... 398/70 |
| 7,761,008 B2 | 7/2010 | Kida et al. | |

(Continued)

FOREIGN PATENT DOCUMENTS

| | | |
|---|---|---|
| EP | 1 887 717 A1 | 2/2008 |
| JP | 2008-118296 A | 5/2008 |
| WO | 2009/143893 A1 | 12/2009 |

OTHER PUBLICATIONS

Rohde, et al., "Securing Passive Optical Networks Against Signal Injection Attacks", Proceedings of the 11th International IFIP TC6 Conference on Optical Network Design and Modeling; [Lecture Notes in Computer Science], May 29, 2007, pp. 96-100, Springer Verlag, Berlin/Heidelberg, Germany, ISBN: 978-3-540-72729-3.

*Primary Examiner* — Hanh Phan
(74) *Attorney, Agent, or Firm* — Nelson Mullins Riley & Scarborough LLP

(57) ABSTRACT

A method removes signal interference in a passive optical network. The passive optical network includes an optical line terminal, a splitting unit coupled with the optical line terminal, an optical network unit coupled with the splitting unit, and an identification signal uniquely associated with the optical network unit. The method includes the steps of sending a first signal, detecting the first signal, comparing the detected first signal with an identification signal and decoupling the optical network unit from the splitting unit if the comparing step results in a mismatch.

17 Claims, 6 Drawing Sheets

(56) References Cited

U.S. PATENT DOCUMENTS

| | | | |
|---|---|---|---|
| 2004/0156635 A1* | 8/2004 | Felske et al. ................... 398/66 |
| 2009/0238564 A1* | 9/2009 | Rohde et al. ................... 398/45 |
| 2011/0076013 A1* | 3/2011 | Valvo et al. .................... 398/30 |

* cited by examiner

METHOD AND APPARATUS FOR PREVENTING SIGNAL INTERFERENCE IN A PASSIVE OPTICAL NETWORK

BACKGROUND OF THE INVENTION

Field of the Invention

The invention refers to an apparatus for preventing signal interference in a passive optical network and to a corresponding method for removing signal interference in a passive optical network.

Passive Optical Networks (PON) are networks of optical fiber lines in which optical light signals are transmitted and distributed without interposition of active amplifying components.

FIG. 1 is a diagrammatic representation of a conventional passive optical network 1. The passive optical network 1 shown is a so-called metro-access network by which data from a public optical fiber network 5 are distributed to a plurality of user units 4 also called ONU (Optical Network Unit). The optical network comprises a so-called OLT 2 (Optical Line Terminal) as access point, which is the transmission interface between the passive optical network 1 and the overlying public optical backbone fiber network 5. Moreover, the passive optical network 1 comprises a splitting unit 3 which connects a central cable 6 coming from the OLT 2 to a plurality of arms 7, each arm 7 ending at an ONU 4.

Conventional PONs are bidirectional networks, in particular they distribute downstream traffic from the optical line terminal (OLT) to optical network units (ONUS) in a broadcast manner while the ONUS send upstream data packets.

In fiber-optic communications, wavelength-division multiplexing (WDM) is a technology which multiplexes multiple optical carrier signals on a single optical fiber by using different wavelengths of laser light to carry different signals. This allows for a multiplication in capacity, in addition to enabling bidirectional communications over one strand of fiber.

Conventionally passive optical networks use a specific wavelength for downstream communication (from the OLT to the ONUS) whereas for upstream traffic (from the ONUS to the OLT) different solutions are known in the art. According to one known solution all ONUS transmit over the same wavelength (time division multiplexing technique), whereas, according to another known solution, wavelength-division multiplexing (WDM) is employed (the so-called WDM-PON approach). However, in both architectures the same OLT and the same central cable are shared by a plurality of ONUs Unfortunately, in such passive optical networks, interference in a single ONU can cause a collapse of the entire access network during a data transmission from the ONUS to the OLT whenever a disturbed signal coming from an ONU reaches the central cable and there causes a disturbed overall signal which can no longer be processed correctly.

A particularly critical situation is given when a single ONU starts to transmit permanently or casually light at a wavelength reserved for the upstream communication of another ONU. Especially for networks using a single wavelength for the shared upstream information flow, this would mean that the communication between ONUS and OLT is significantly affected or even impossible.

As a consequence, although the opposite direction (OLT to ONUS) is still working properly, the operation of the PON would be significantly limited or even interrupted. With the increasing number of user units (ONUs) connected to a single OLT this scenario would be particularly inconvenient for the enterprise users or wireless network operators.

These disturbances are usually referred to as attacks, even if these events are not necessarily restricted to intentional activities.

When such signal interference occurs in conventional optical networks, the fault must be eliminated by a service technician who examines and individually disconnects the individual arms at the splitting unit of the optical network until the causal fault has been found. This procedure can be very time-consuming and leads to a long failure time of the optical network.

A large number of methods for removing signal interference in a passive optical network (PON) are known from the prior art. In one known method, for example, the restoration of the path affected by the attack includes the manual substitution of hardware elements, which can be very time-consuming and leads to a long re-activation time. In other known methods the disconnection of the ONU affected by the attack includes the simultaneous disconnection of an entire group of users, which could be particularly inconvenient for the enterprise users or wireless network operators.

Based upon the above discussions, it is concluded that there is a need in the art, for an improved method and apparatus for removing signal interference in a passive optical network (PON). The improved method should be capable of removing signal interference or injection attacks in a passive optical network in an effective and automated way without that the removal of the interference causes the disconnection of an entire group of users.

SUMMARY OF THE INVENTION

In order to overcome the above-described need in the art, the present invention discloses a method for removing signal interference in a passive optical network, the passive optical network including an optical line terminal, a splitting unit coupled with the optical line terminal, an optical network unit coupled with the splitting unit, and an identification signal uniquely associated with the optical network unit; the method comprising the following steps: sending a first signal, detecting the first signal; comparing the detected first signal with the identification signal decoupling the optical network unit from the splitting unit if the comparing step results in a mismatch.

In a next embodiment the method further comprises the step in which the optical network unit sends the first signal.

In other embodiments of the present invention the method further comprises the step according to which the splitting unit detects the first signal, compares the detected first signal with the identification signal and decouples the optical network unit from the splitting unit if the comparing step results in a mismatch.

In other embodiments of the present invention the method further comprises the step according to which the splitting unit maintains the optical network unit coupled with the splitting unit if the comparing step results in a match.

In a further embodiment the method further comprises the step according to which the splitting unit recouples the optical network unit with the splitting unit if the optical network unit is not coupled with the splitting unit and the comparing step results in a match.

In a further embodiment the method further comprises the step according to which switching element maintains the optical network unit decoupled from the splitting unit if the optical network unit is not coupled with the splitting unit and if the comparing step in the first controlling means results in a mismatch It is also an embodiment, that the splitting unit further comprises a switch unit for coupling and re-coupling the optical network unit with the splitting unit and for decoupling the optical network unit from the splitting unit.

In a further embodiment, the switch unit further comprises a first detecting element for detecting the first signal, a first controlling means for storing the identification signal in a first recording medium and for comparing the detected first signal with the identification signal stored in the first recording medium and a switching element for coupling and re-coupling the optical network unit with the splitting unit and for decoupling the optical network unit from the splitting unit.

In other embodiments of the present invention the method further comprises the steps according to which the first detecting element detects the first signal, the first controlling means compares the detected first signal with the identification signal stored in the first recording medium, and the switching element decouples the optical network unit from the splitting unit if the comparing step in the first controlling means results in a mismatch.

In a further embodiment, the method further comprises the step according to which the switching element maintains the optical network unit coupled with the splitting unit if the comparing step in the first controlling means results in a match.

In a further embodiment the method further comprises the step according to which the switching element recouples the optical network unit with the splitting unit if the optical network unit is not coupled with the splitting unit and if the comparing step in the first controlling means results in a match.

It is also an embodiment, that the optical line terminal comprises a second detecting element for detecting the first signal, and a second controlling means for storing the identification signal in a second recording medium and for comparing the detected first signal with the identification signal stored in the second recording medium.

It is also an embodiment, that the passive optical network further comprises a supervisory channel linking the optical line terminal with the splitting unit.

In a further embodiment, the method further comprises the following steps: the second detecting element detects the first signal, the second controlling means compares the detected first signal with the identification signal stored in the second recording medium, and the optical line terminal sends through the supervisory channel a request to the splitting unit to decouple the optical network unit from the splitting unit if the comparing step in the second controlling means results in a mismatch.

In a next embodiment, the identification signal comprises a continuous wave optical signal modulated at a low frequency.

In an alternative embodiment of the invention, the continuous wave optical signal modulated at a low frequency (41) is expressed by the following:

$$s(t) = CW + \cos(2\pi v_0 t) \cdot rect\left(\frac{t}{T}\right),$$

CW being a constant term representing a continuous wave, $v_0$ being a low frequency tone, t being the time, T being the duration of the identification signal, and $$rect\left(\frac{t}{T}\right)$$

being a function being equal to one for $$-\frac{T}{2} < t < \frac{T}{2}$$

and being equal to zero elsewhere.

It is also an embodiment, that the identification signal further comprises an acknowledgment data packet.

In a further embodiment, the method further comprises the following steps: the optical line terminal stores an updated identification signal in the second recording medium, the optical line terminal sends the updated identification signal to the splitting unit through the supervisory channel, the splitting unit stores the updated identification signal in the first recording medium and the optical line terminal sends the updated identification signal to the optical network unit.

The problem stated above is also solved by a system for removing signal interference in a passive optical network, comprising: an optical line terminal, a splitting unit coupled with the optical line terminal, an optical network unit coupled with the splitting unit, an identification signal uniquely associated with the optical network unit, wherein the optical network unit is configured to send a first signal and the splitting unit is configured to detect the first signal, compare the detected first signal with the identification signal and decouple the optical network unit from the splitting unit if the comparing results in a mismatch.

The invention is explained by way of example in more detail below with the aid of the attached drawings.

DESCRIPTION OF THE INVENTION

Figure 1:
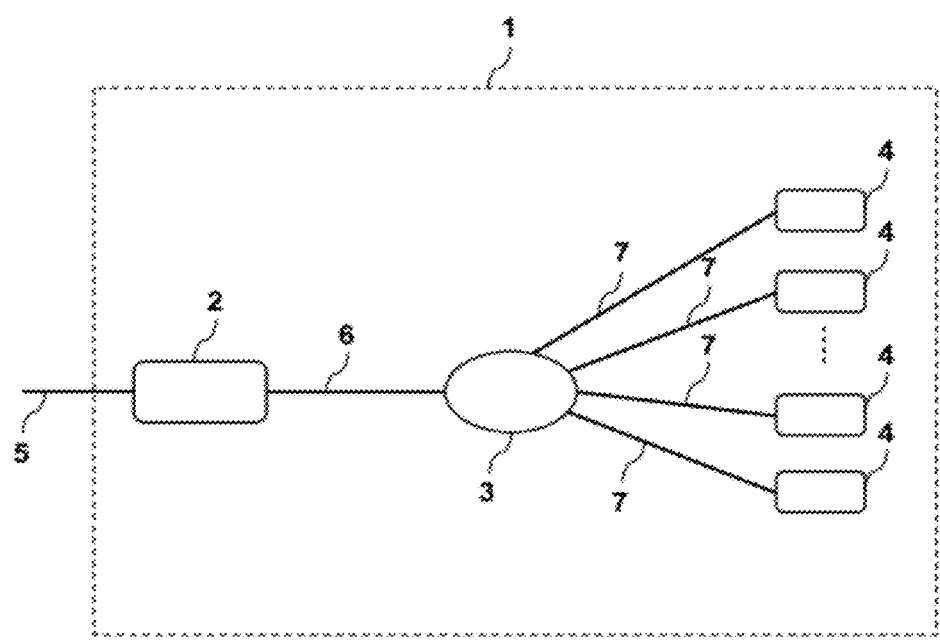
FIG. 1 is a diagrammatic representation of a conventional passive optical network.

As regards the description of FIG. 1, reference is made to the background of the invention.

Illustrative embodiments will now be described with reference to the accompanying drawings to disclose the teachings of the present invention. While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 2:
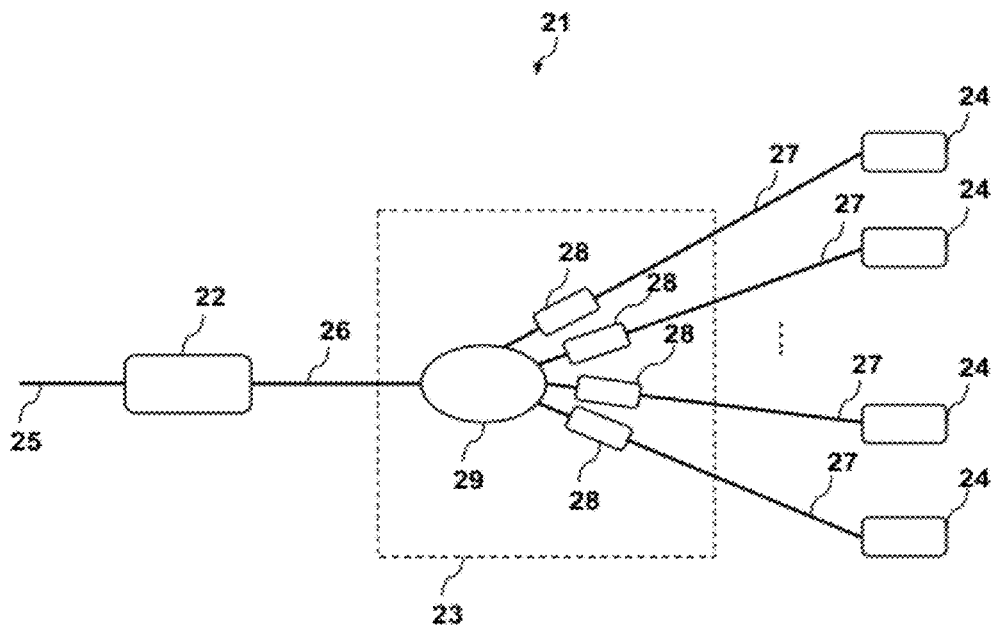
FIG. 2 is a diagrammatic representation of a passive optical network according to one embodiment of the invention.

FIG. 2 is a diagrammatic representation of a passive optical network 21 according to one embodiment of the invention. The passive optical network 21 shown in FIG. 2 is a so-called metro-access network by which data from a public optical fiber network 25 are distributed to a plurality of user units 24 also called ONU (Optical Network Unit). The optical network comprises an OLT 22 (Optical Line Terminal) as access point, which is the transmission interface between the passive optical network 21 and the overlying public optical fiber network 25. Moreover, the passive optical network 21 comprises a splitting unit 23 which connects a central cable 26 coming from the OLT 22 to a plurality of arms 27, each arm 27 ending at an ONU 24. Each ONU 24 may represent a single subscriber, and in FIG. 2, as an example, only four ONUs 24 are shown for the purpose of a clearer representation. However, more than 256 ONUs 24 may be connected to a single splitting unit 23. In the embodiment of the invention shown in FIG. 2, the splitting unit 23 comprises an optical splitter 29, for connecting the central cable 26 to the plurality of arms 27, and a plurality of switch units 28 for coupling and decoupling the optical network units 24 with the optical splitter 29. In particular, the splitting unit 23 may comprise one switch unit 28 for each of the arm 27.

In the present invention each ONU 24 is uniquely associated with an identification signal which, in one embodiment of the invention may be represented by a continuous wave optical signal modulated at a low frequency (e.g. kilo-Hertz to hundreds of Mega-Hertz), the frequency tone being the unique identifier of the single ONU 24. In other embodiments of the invention the identification signal may be also be represented by a sequence and, in particular, by a finite sequence.

During normal operation an ONU 24 sends a request for communication to the OLT 22, followed by a first signal which, if the ONU 24 is working properly, should correspond exactly to the identification signal (i.e. the continuous wave optical signal modulated at a low frequency). The splitting unit 23 detects the first signal sent by the specific ONU 24 and compares this detected first signal with the identification signal which corresponds to the specific ONU 24. If this comparing step corresponds to a match it means that the ONU 24 is working properly, i.e. no interference or attack occurred, and in this case splitting unit ensures that the connection to the ONU is established. Conversely, if the comparing step corresponds to a mismatch it means that the specific ONU 24 is not working properly, i.e. an interference or an attack occurred, and in this case the splitting unit 23 decouples the specific ONU 24 from the passive optical network 21. Therefore, according to the present embodiment of the invention, the splitting unit 23 guarantees for the security of the network by checking the identification signal of each specific ONU 24 independently. As a consequence, a possible interference will be efficiently identified and rapidly removed by the splitting unit 23.

Figure 3:
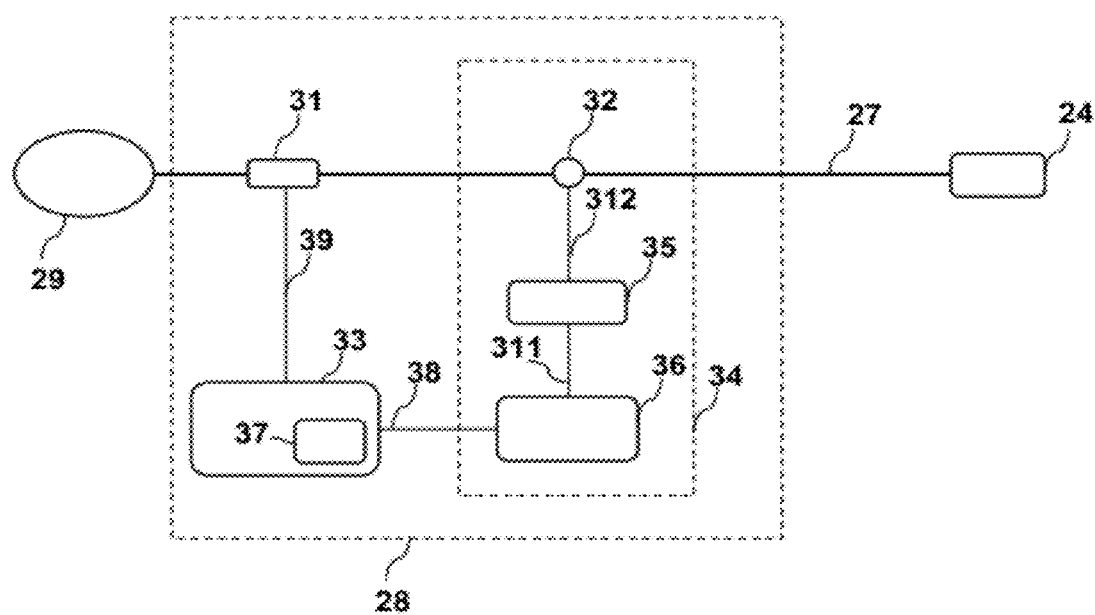
FIG. 3 is a diagrammatic representation of a switch unit according to one embodiment of the invention.

FIG. 3 is a diagrammatic representation of a switch unit 28 according to one embodiment of the invention. The switch unit 28 shown in FIG. 3 is a particular implementation of the switch unit 28 shown in FIG. 2 according to one embodiment of the invention and is suitable for coupling and decoupling a specific ONU 24 with the optical splitter 29 through the arm 27. The switch unit 28 shown in FIG. 3 includes a first detecting element 34 for detecting the first signal sent by the ONU 24 through the arm 27, a first controlling means 33 for storing the identification signal in a first recording medium 37 and for comparing the detected first signal with the identification signal stored in the first recording medium 37 and a switching element 31 for coupling and decoupling the optical network unit from the optical splitter 29. Moreover, the first detecting element 34 includes a frequency detector 36, a photodiode 35 coupled with the frequency detector 36 through the link 311 and a tap 32 coupled with the photodiode 35 through the link 312 for detecting the first signal in the arm 27. Moreover the first controlling means 33 is coupled with the frequency detector 36 through the control link 38 and with the switching element 31 through the control link 39.

During normal operation the ONU 24 sends a request for communication, containing a first signal which, if the ONU 24 is working properly, should correspond exactly to the identification signal (e.g. the continuous wave optical signal modulated at a low frequency). The first detecting element 34 detects the first signal sent by the specific ONU 24 through the tap 32 and the photodiode 35, while the frequency detector 36 detects the frequency tone included in the first signal. The first controlling means 33, which may be a switch control unit, compares the detected first signal with the identification signal related to the specific ONU 24 which is stored in the first recording medium 37 which corresponds to the specific ONU 24.

If this comparing step corresponds to a match it means that the ONU 24 is working properly, i.e. no interference or attack occurred, and in this case for the switching element 31 ensures that the connection to the ONU is established. Conversely, if the comparing step corresponds to a mismatch it means that the specific ONU 24 is not working properly, i.e. an interference or an attack occurred, and in this case the switching element 31 decouples the specific ONU 24 from the passive optical network 21.

As soon as the interference or the attack has been removed, and the specific ONU 24 sends a new request for communication, containing a first signal, this new request together with the first signal is detected again from the first detecting element 34. Consequently the first controlling means 33 compares the detected first signal with the identification signal related to the specific ONU 24 stored in the first recording medium 37, and if the comparing step corresponds to a match the switching element 31 ensures that the connection between the splitting unit 23 and the ONU 24 is established. In particular the splitting unit 23 maintains the optical network unit (24) coupled with the splitting unit if the comparing step results in a match or recouples the optical network unit (24) with the splitting unit 23 if the optical network unit (24) is not coupled with the splitting unit (for example because the optical network unit 24 has been previously decoupled from the splitting unit) and the comparing step results in a match.

Therefore, according to the present embodiment of the invention, the splitting unit 23, and in particular the switch unit 28, guarantees for the security of the network by checking the identification signal of each specific ONU 24 independently. As a consequence, a possible interference will be efficiently identified and rapidly removed by the switch unit 28.

The embodiment of the invention shown in FIG. 3 can be implemented in different ways. As shown in FIG. 3 the implementation may require the use of tap couplers, photodiodes and optical switches. In particular the optical switching element 31 may be designed as "Normally Closed" (NC) component wherein the specific arm 27 is connected to the passive optical network if no electrical signal is applied to the switching element 31. The use of discrete components and micro-optics may represent an option as well as the use of Planar Lightwave Circuits (PLC) which offers several advantages like, for example, reduced size, reduced costs due the capability of integrating several optical components, and low power supply. In the PLC configuration, the switching functionality may be obtained by means of a thermal effect which may require a heather element for the switch unit 28.

Figure 4:
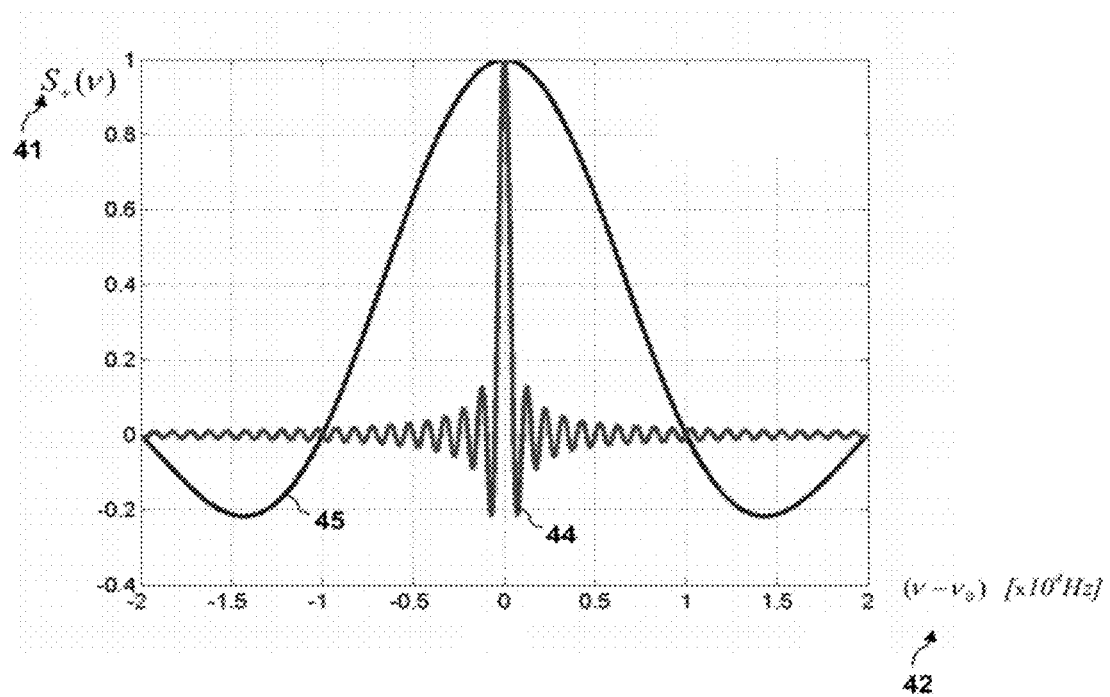
FIG. 4 is a representation of the normalized Fourier transform of the identification signal versus frequency difference $(v-v_-)$ according to one embodiment of the invention.

FIG. 4 is a representation of the normalized Fourier transform $S_+(v)$ 41 of the identification signal versus frequency difference $(v-v_=)$ 42 according to one embodiment of the invention. In the present embodiment, the identification signal may be represented by a continuous wave optical signal modulated at a low frequency (e.g. kilo-Hertz to hundreds of Mega-Hertz), the frequency tone being the unique identifier of the single ONU 24.

In particular, in the present embodiment, the continuous wave optical signal modulated at a low frequency 41) may be expressed by the following formula:

$$s(t) = CW + \cos(2\pi v_0 t) \cdot rect\left(\frac{t}{T}\right), \quad (1)$$

Where CW may represent a continuous wave (e.g. the continuous wave generated by the ONU 24 laser), $v_0$ being a low frequency tone, t being the time, T being the duration of the identification signal, and $$rect\left(\frac{t}{T}\right)$$

being a function being equal to one for $$-\frac{T}{2} < t < \frac{T}{2}$$

and being equal to zero elsewhere.

In the following, since the CW term is constant, it will be neglected without loss of generality.

The Fourier transform of the continuous wave optical signal modulated at a low frequency is:

$$S(v) = T \cdot \sin c[(v+v_0) \cdot T] + T \cdot \sin c[(v-v_0) \cdot T],$$

where the sin c(x) function is defined as $$\text{sinc}(x) = \frac{\sin(\pi x)}{\pi x}.$$

S(v) is a symmetric function around the zero frequency, so that in the following only its normalized part:

$$S_+(v) = \sin c[(v-v_0) \cdot T]$$

will be analyzed.

In FIG. 4, the normalized Fourier transform $S_+(v)$ 41 of the continuous wave optical signal modulated at a low frequency is shown for different values of the duration T of the identification signal, in particular for T=0.0001 sec 45 and for T=0.002 sec 44. It can be seen that the spectrum 41 becomes narrower when increasing T, making the identification of the frequency easier for the splitting unit.

The zeros of $S_+(v)$ are located at the following frequencies:

$$v = v_0 + \frac{n}{T},$$

n being an integer number, with $n \neq 0$

In order to obtain a quantification of the minimum required duration T of the identification signal, the relative uncertainty on the peak frequency $\delta v$ is defined as ratio between the interval between the zero of order n and −n and $v_0$, that can be expressed as $$\delta v = \frac{\Delta v}{v_0} = \frac{1}{v_0} \cdot \frac{2 \cdot n}{T}$$

And therefore $$T = \frac{1}{v_0} \cdot \frac{2 \cdot n}{\delta v}$$

i.e. at a given frequency $v_0$ the required duration T of the identification signal increases by decreasing $\delta v$.

Furthermore, the larger the uncertainty $\delta v$ is, the larger the electrical bandwidth required by the ensemble of the pilot tones will be. Based on the above analysis, the minimum value of the total required electrical bandwidth can be computed as follows:

$$TotalBandwidth = n_{sp} \cdot \left(\frac{2n}{T}\right)$$

Where $n_{sp}$ represents the number of ONUs 24 of the splitting unit (i.e. the splitting ratio).

The duration T of the identification signal can be expressed in terms of number $(n_T)$ of periods of the pilot tone, leading to:

$$T = \frac{n_T}{v_0},$$

$$\delta v = \frac{\Delta v}{v_0} = \frac{2 \cdot n}{n_T}$$

$$TotalBandwidth = n_{sp} \cdot \left(\frac{2n}{n_T} v_0\right)$$

These relationships indicate that the relative accuracy depends only on the number of periods contained in the identification signal and not on the absolute value of the tone frequency. As a consequence, for a given accuracy, the duration of the identification signal can be reduced by increasing the frequency of the pilot tone $v_0$ at the expense of an increased total electrical bandwidth.

Figure 5:
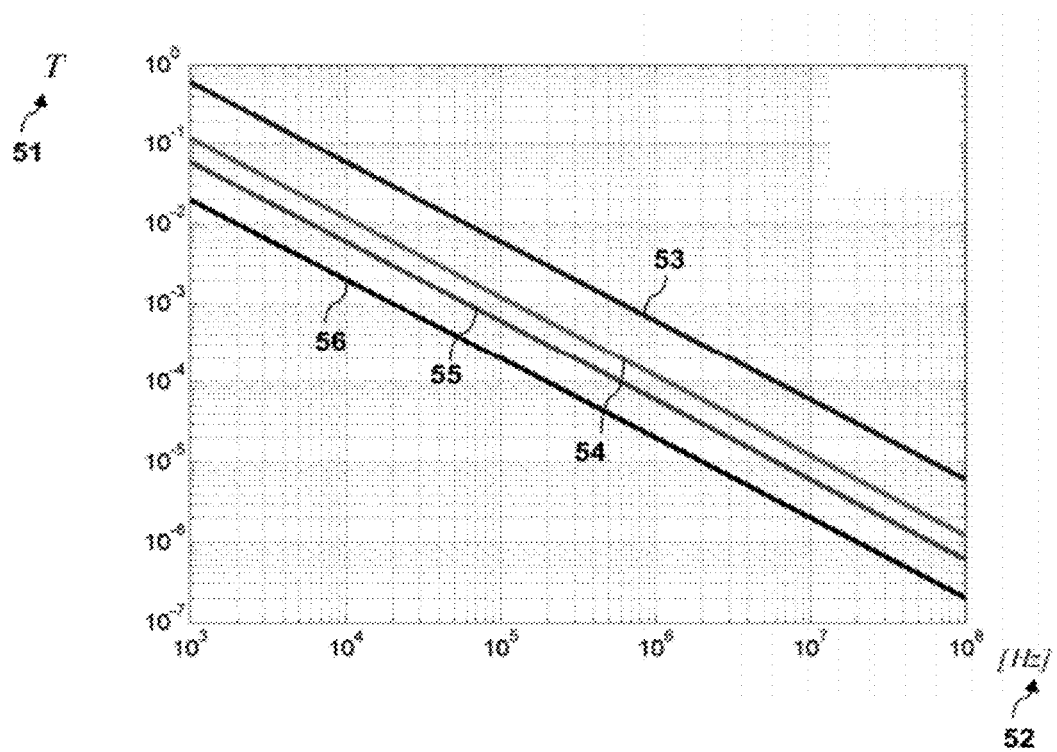
FIG. 5 is a representation of the required duration T of the identification signal versus frequency according to one embodiment of the invention.

FIG. 5 is a representation of the required duration T 51 of the identification signal versus frequency 52 according to one embodiment of the invention and for n=3, and $\delta v$=1% 53, $\delta v$=5% 54, $\delta v$=10% 55, $\delta v$=30% 56 as a function of the low frequency tone $v_0$ 52. For this evaluation, $v_0$ is assumed to be representative of the frequency range of the ensemble of the low frequency signals related to the arms of the splitting unit. It is worthwhile to note, that for tone frequencies in the MHz range, relative accuracies below 1% can be achieved by keeping the duration T 51 of the identification signal below 1 ms, so that the overall performance of the network is almost unaffected.

Figure 6:
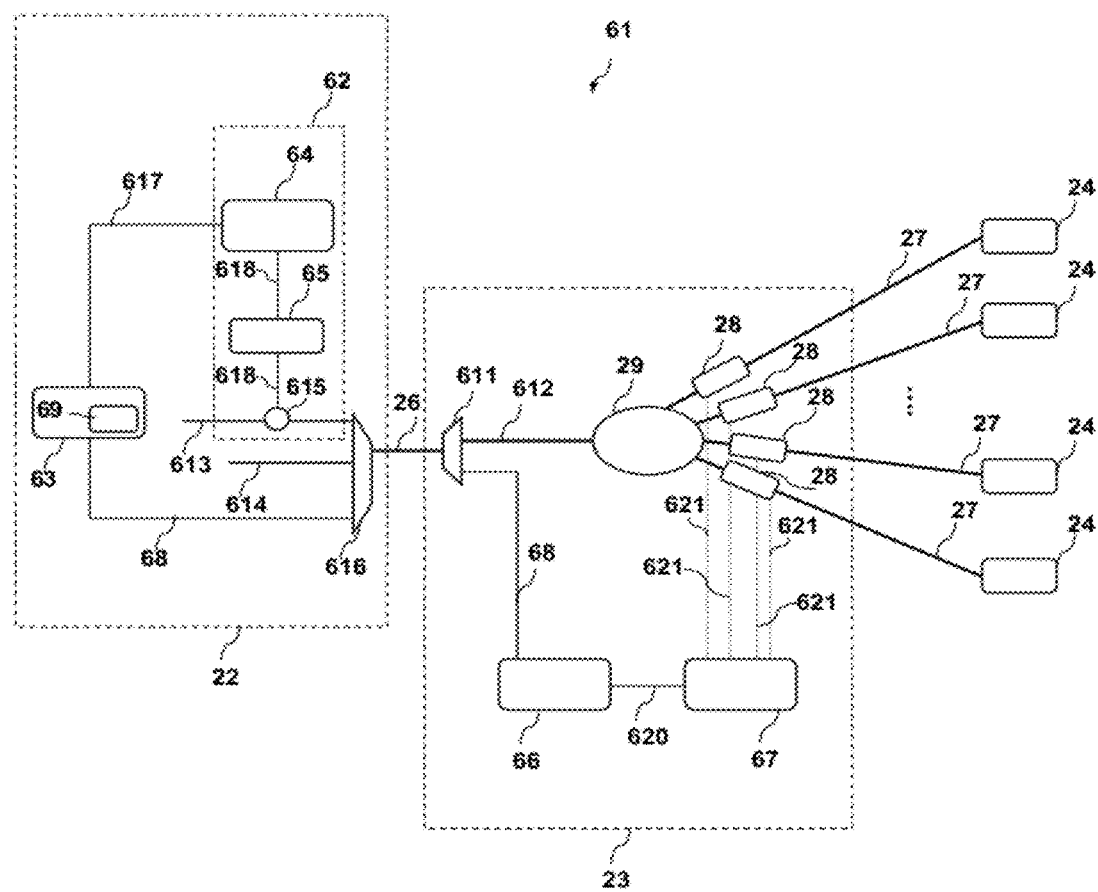
FIG. 6 is a diagrammatic representation of a passive optical network according to one embodiment of the invention.

FIG. 6 is a diagrammatic representation of a passive optical network 61 according to one embodiment of the invention. The passive optical network 61 shown in FIG. 6 is a so-called metro-access network by which data from a public optical fiber network are distributed to a plurality of user units 24 also called ONU (Optical Network Unit). The optical network comprises an OLT 22 (Optical Line Terminal) as access point, which is the transmission interface between the passive optical network 61 and the overlying public optical backbone fiber network. Moreover, the passive optical network 61 comprises a splitting unit 23 which connects a central cable 26 coming from the OLT 22 to a plurality of arms 27, each arm 27 ending at an ONU 24. Each ONU 24 may represent a single subscriber, and in FIG. 6, as an example, only four ONUS 24 are shown for the purpose of a clearer representation. However, more than 256 ONUS 24 may be connected to a single splitting unit 23. The OLT 22, according to the present embodiment of the invention, comprises a multiplexer/demultiplexer 616 for multiplexing the downstream signal travelling along the optical link 614 to the central cable 26 and for demultiplexing a plurality of upstream signals 615 coming from the same central cable 26. The OLT 22, according to the present embodiment of the invention, further comprises a second detecting element 62 which includes a frequency detector 64, a photodiode 65 coupled with the frequency detector 64 through the link 618 and a tap 615 coupled with the photodiode 65 through the link 619 for detecting the first signal in each of the upstream signals 613. The second detecting element 62, and in particular its frequency detector 64, is further coupled through the control link 617 with a second controlling means 69 which is suitable for storing the identification signal in a second recording medium 69 and for comparing the detected first signal with the identification signal stored in the second recording medium 69. The OLT 22, according to the present embodiment of the invention, further comprises an optical port 68 for the supervisory channel to convey this channel from the optical line terminal 22 with the splitting unit 23. In particular the supervisory channel is an Unidirectional Optical Supervisory Channel (OSC) and transport control information from the second controlling means 69 to the splitting unit 23 through the multiplexer/demultiplexer 616 and the central cable 26 so that the Unidirectional Optical Supervisory Channel (OSC) is multiplexed by together with the downstream signal (is usually one signal/wavelength) 614 in the central cable 26.

Conventional Coarse Wavelength Division Multiplexing (CWDM) filters and Array Waveguide Grating (AWG) base components can be used to implement the multiplexer/demultiplexer unit 616 and the demultiplexer unit 611.

In the present embodiment of the invention, the splitting unit 23 comprises a demultiplexer 611 for demultiplexing the Unidirectional Optical Supervisory Channel (OSC) 68 and the cable conveying the downstream and upstream signals 612. The splitting unit 23 further comprises an optical splitter 29 for connecting the cable conveying the downstream and upstream signals 612 to the plurality of arms 27, and a plurality of switch units 28 for coupling and decoupling the optical network units 24 with the optical splitter 29. In particular, the splitting unit 23 may comprise one switch unit 28 for each of the arm 27. The splitting unit 23 further comprises an optical supervisory channel detection unit 66 for detecting the signals conveyed in the Optical Supervisory Channel, and an Optical Supervisory Channel switch control unit 67 coupled with the Optical Supervisory Channel detection unit 66 through the link 620 for controlling the coupling and de-coupling operation of the switch units 28 and linked to these switch units 28 through the control links 621.

According to the present embodiment of the invention, as shown in FIG. 6, the identification signal further comprises an acknowledgment data packet. Therefore, in the present embodiment, the identification signal comprises a continuous wave optical signal modulated at a low frequency represented for example by the formula (1), and an acknowledgment data packet conveying information to be compared with the one stored in the second recording medium 69 (e.g. in a look-up table).

According to the present embodiment of the invention, during normal operation the ONU 24 sends a request for communication, beginning with the identification signal (e.g. the continuous wave optical signal modulated at a low frequency), followed by data packets including acknowledgements data packets detected by means of a receiver connected to line 613 but not shown in the diagram. In this way, the information contained in the acknowledgement data packets and indicating which ONU is sending the request is extracted by the OLT 22. In the present embodiment the comparing step includes comparing both the frequency tone related to the continuous wave optical signal modulated at a low frequency and the acknowledgment data packet.

As an effect, the present embodiment allows the detection and the removal of interference also in the case in which the first signal includes a matching frequency tone but a wrong acknowledgment data packet. According to the present embodiment of the invention, the OLT 22 still guarantees for the security of the network by checking the identification signal of each specific ONU 24 independently, while the splitting unit 23, and in particular the switch unit 28, merely executes the requests to decouple the ONU 24 from the network if an interference occurs.

According to another embodiment of the invention, which can be also represented in FIG. 6, the identification signal can be changed and updated on a regular basis, in particular the tone frequency of the continuous wave optical signal modulated at a low frequency can be changed and updated regularly. According to the present embodiment, the OLT 22 updates the tone frequency related to a particular ONU 24 and stores the new value in the second recording medium 69, at the same time the OLT sends the updated tone frequency related to a particular ONU 24 to the splitting unit (23) through the supervisory channel via the link 68 and the splitting unit (23) stores the updated identification signal in the first recording medium (37), contemporaneously the optical line terminal (22) sends the updated value of the frequency of the identification signal to the optical network unit (24) which sets the frequency of the new tone to the updated value.

One of the effects of some embodiments of the invention, is that the number of arms 27 of the splitting unit 23 can be increased beyond the limitation imposed by the number of ports of AWG-Demultiplexers or CWDM-Demultiplexers. Thus, each OLT 22 is allowed to serve a higher number of ONUS 24 reducing in this way the reduced cost per arm 27.

A further effect of some embodiments of the invention, is that no spectrally separated optical control signals are required to control the connection of each arm 27, so that the number of ports can be increased without the use of demultiplexer (AWGs or CWDM filters). As a consequence, neither an array of fixed wavelength laser nor tuneable lasers are necessary in the OLT 22.

A further effect of some embodiments of the invention, is that the OLT does not require an optical amplifier and the related requirement on the maximum allowed distance between the OLT 22 and the splitting unit 23 becomes unnecessary.

A further effect of some embodiments of the invention, is the capability to exclude each port from the network separately. In the present invention the number of ONUs 24 served by a single OLT 22 can be increased to 256 or beyond by simultaneously guaranteeing the possibility to disconnect each individual port.

A further effect of some embodiments of the invention, is that the splitting unit 23 guarantees for the security of the network by checking the identification signal of each arm 27 independently. As a consequence, an attacking port will be identified in a fast way by the splitting unit 23. As a further consequence, the attacking port does not need necessarily to be identified by the OLT 22 and a corresponding procedure is intrinsically not necessary.

The invention claimed is:

1. A method for removing signal interference in a passive optical network, the passive optical network having an optical line terminal, a splitting unit coupled with the optical line terminal, an optical network unit coupled with the splitting unit, and an identification signal uniquely associated with the optical network unit, which method comprises the steps of:
    sending a first signal;
    detecting the first signal;
    comparing the first signal detected with the identification signal; and
    decoupling the optical network unit from the splitting unit if the comparing step results in a mismatch;
    wherein the splitting unit performs the steps of detecting the first signal, comparing the first signal detected with the identification signal and decoupling the optical network unit from the splitting unit if the comparing step results in the mismatch.

2. The method according to claim 1, which further comprises sending the first signal from the optical network unit.

3. The method according to claim 1, wherein the splitting unit maintains the optical network unit being coupled with the splitting unit if the comparing step results in a match.

4. The method according to claim 1, which further comprises recoupling, via the splitting unit, the optical network unit with the splitting unit if the optical network unit is not coupled with the splitting unit and the comparing step results in a match.

5. The method according to claim 1, wherein the splitting unit further comprises a switch unit for coupling and re-coupling the optical network unit with the splitting unit and for decoupling the optical network unit from the splitting unit.

6. The method according to claim 5, wherein the switch unit further comprises a first detecting element for detecting the first signal, a first controlling means for storing the identification signal in a first recording medium and for comparing the detected first signal with the identification signal stored in the first recording medium, and a switching element for coupling and re-coupling the optical network unit with the splitting unit and for decoupling the optical network unit from the splitting unit.

7. The method according to claim 6, which further comprises:
    detecting the first signal with the first detecting element;
        comparing, via the first controlling means, the first signal detected with the identification signal stored in the first recording medium; and
        decoupling the optical network unit from the splitting unit via the switching element if the comparing step in the first controlling means results in a mismatch.

8. The method according to claim 6, which further comprises maintaining, via the switching element, that the optical network unit is coupled with the splitting unit if the comparing step in the first controlling means results in a match.

9. The method according claim 6, which further comprises recoupling, via the switching element, the optical network unit with the splitting unit if the optical network unit is not coupled with the splitting unit and if the comparing step in the first controlling means results in a match.

10. The method according to claim 1, wherein the optical line terminal contains a second detecting element for detecting the first signal, and a second controlling means for storing the identification signal in a second recording medium and for comparing the first signal detected with the identification signal stored in the second recording medium.

11. The method according to claim 10, wherein the passive optical network further comprises a supervisory channel linking the optical line terminal with the splitting unit.

12. The method according to claim 11, which further comprises:
    detecting the first signal via the second detecting element resulting in a detected first signal;
    comparing, via the second controlling means, the detected first signal with the identification signal stored in the second recording medium; and
    sending, via the optical line terminal, through the supervisory channel a request to the splitting unit to decouple the optical network unit from the splitting unit if the comparing step in the second controlling means results in a mismatch.

13. The method according to claim 1, wherein the identification signal has a continuous wave optical signal modulated at a low frequency.

14. The method according to claim 12, wherein the continuous wave optical signal modulated at a low frequency is expressed by the following:

$$s(t) = CW + \cos(2\pi v_0 t) \cdot rect\left(\frac{t}{T}\right),$$

CW being a constant term representing the continuous wave, $v_0$ being a low frequency tone, t being time, T being a duration of the identification signal, and $$rect\left(\frac{t}{T}\right)$$

being a function being equal to one for $$-\frac{T}{2} < t < \frac{T}{2}$$

and being equal to zero elsewhere.

15. The method according to claim 12, wherein the identification signal further includes an acknowledgment data packet.

16. The method according to claim 11, further comprising:
    storing, via the optical line terminal, an updated identification signal in the second recording medium;
    sending, via the optical line terminal, the updated identification signal to the splitting unit through the supervisory channel;
    storing, via the splitting unit, the updated identification signal in the first recording medium; and
    sending, via the optical line terminal, the updated identification signal to the optical network unit.

17. A system for removing signal interference in a passive optical network, the system comprising:
    an optical line terminal;
    a splitting unit coupled with said optical line terminal;
    an optical network unit coupled with said splitting unit; and an identification signal uniquely associated with the optical network unit;

wherein said optical network unit configured to send a first signal and said splitting unit configured to detect the first signal, compare a detected first signal with the identification signal and decouple said optical network unit from said splitting unit if the comparing results in a mismatch.

* * * * *